United States Patent
Wong

(10) Patent No.: US 11,267,581 B2
(45) Date of Patent: Mar. 8, 2022

(54) UNMANNED AERIAL VEHICLE (UAV) LAUNCH AND RECOVERY

(71) Applicant: Insitu, Inc., Bingen, WA (US)

(72) Inventor: John R. Wong, Klickitat, WA (US)

(73) Assignee: Insitu, Inc., Bingen, WA (US)

( * ) Notice: Subject to any disclaimer, the term of this patent is extended or adjusted under 35 U.S.C. 154(b) by 771 days.

(21) Appl. No.: 16/133,296

(22) Filed: Sep. 17, 2018

(65) Prior Publication Data
US 2020/0087004 A1 Mar. 19, 2020

(51) Int. Cl.
*B64F 1/12* (2006.01)
*B64C 39/02* (2006.01)

(52) U.S. Cl.
CPC .............. *B64F 1/12* (2013.01); *B64C 39/024* (2013.01); *B64C 2201/182* (2013.01); *B64C 2201/208* (2013.01)

(58) Field of Classification Search
CPC ........ B64F 1/12; B64F 1/0297; B64C 39/024; B64C 2201/208; B64C 2201/182; B64C 2201/14; B64C 2201/08
See application file for complete search history.

(56) References Cited

U.S. PATENT DOCUMENTS

| | | | | |
|---|---|---|---|---|
| 9,845,165 | B2 * | 12/2017 | Michalski | G05D 1/0676 |
| 9,928,749 | B2 * | 3/2018 | Gil | B64D 1/00 |
| 10,131,451 | B2 * | 11/2018 | Salgueiro | B64D 1/00 |
| 10,287,033 | B2 * | 5/2019 | Hu | B64F 1/362 |
| 10,604,252 | B2 * | 3/2020 | Blake | B64F 1/32 |
| 10,850,840 | B2 * | 12/2020 | Schwartz | H02G 1/02 |
| 10,913,546 | B2 * | 2/2021 | Krauss | G05D 1/0676 |
| 11,040,782 | B1 * | 6/2021 | Johnson | B64F 1/00 |
| 2011/0233329 | A1 * | 9/2011 | McGeer | B64F 1/029 244/110 F |
| 2015/0239578 | A1 * | 8/2015 | McGeer | B64F 1/0297 244/110 R |
| 2016/0144982 | A1 * | 5/2016 | Sugumaran | B64F 1/005 244/103 R |

FOREIGN PATENT DOCUMENTS

WO 2013055265 4/2013

OTHER PUBLICATIONS

Magicc Lab, "UAV landing in moving truck," video published online Jun. 21, 2011, from [https://www.youtube.com/watch?v=bnG8-U64mws].
Scinews, "Drone landing on a moving car," video published online Jan. 18, 2016, from [https://www.youtube.com/watch?v-f8BbGG9cKBo].
Sidearm, "Sidearm Launch and Recovery System, Runway-Independent Operation of Fixed Wing Aircraft," Aurora Flight Sciences, retrieved online Sep. 6, 2018, from [http://www.aurora.aero/wp-content/uploads/2017/02/Sidearm_brochure_X4-DISTAR-approved.pdf], 2 pages.

* cited by examiner

*Primary Examiner* — Valentina Xavier
(74) *Attorney, Agent, or Firm* — Hanley, Flight & Zimmerman, LLC

(57) ABSTRACT

Unmanned aerial vehicle (UAV) launch and recovery is disclosed. A disclosed example apparatus includes an aircraft mount to be coupled to a vehicle, where the aircraft mount has a magnet, and a support arm to extend from a body of the vehicle and support the aircraft mount, where the support arm is to be moved relative to the vehicle while the vehicle is moving to bring the aircraft mount toward an aircraft to recover the aircraft.

20 Claims, 6 Drawing Sheets

UNMANNED AERIAL VEHICLE (UAV) LAUNCH AND RECOVERY

FIELD OF THE DISCLOSURE

This disclosure relates generally to aircraft and, more particularly, to unmanned aerial vehicle (UAV) launch and recovery.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Features and/or components implemented to allow UAVs to land on runways can add weight, drag, complexity and cost. Weight added to allow landing capabilities reduces payload and fuel that can be stored. Accordingly. foregoing the ability to land on runways allows greater range and/or payload, but necessitates capturing a UAV. UAV Recovery systems can subject the UAV to significant loads during a recovery process due to sudden deceleration of the UAV as a result of an impact with recovery devices. These significant loads can cause damage to the UAV or necessitate strengthening components or features, thereby increasing cost and weight of the UAV.

SUMMARY

An example apparatus includes an aircraft mount to be coupled to a vehicle, where the aircraft mount has a magnet, and a support arm to extend from a body of the vehicle and support the aircraft mount, where the support arm is to be moved relative to the vehicle while the vehicle is moving to bring the aircraft mount toward an aircraft to recover the aircraft.

An example method includes moving a vehicle having an aircraft mount located at an end of a support arm extending from a body of the vehicle, moving the support arm toward an aircraft while the vehicle moves, and coupling, via a magnet of at least one of the vehicle or the aircraft, the aircraft to the aircraft mount when the aircraft moves within proximity of the aircraft mount.

An example aircraft recovery support mount includes a telescopic stem to extend from a body of a vehicle, a support mount interface positioned at an end of the telescopic stem, where the support mount interface has a magnet, and a pivot to couple the telescopic stem to the vehicle, where the pivot is to allow the telescopic stem to move the support mount interface toward an aircraft to recover the aircraft while the vehicle is moving.

Figure 1:
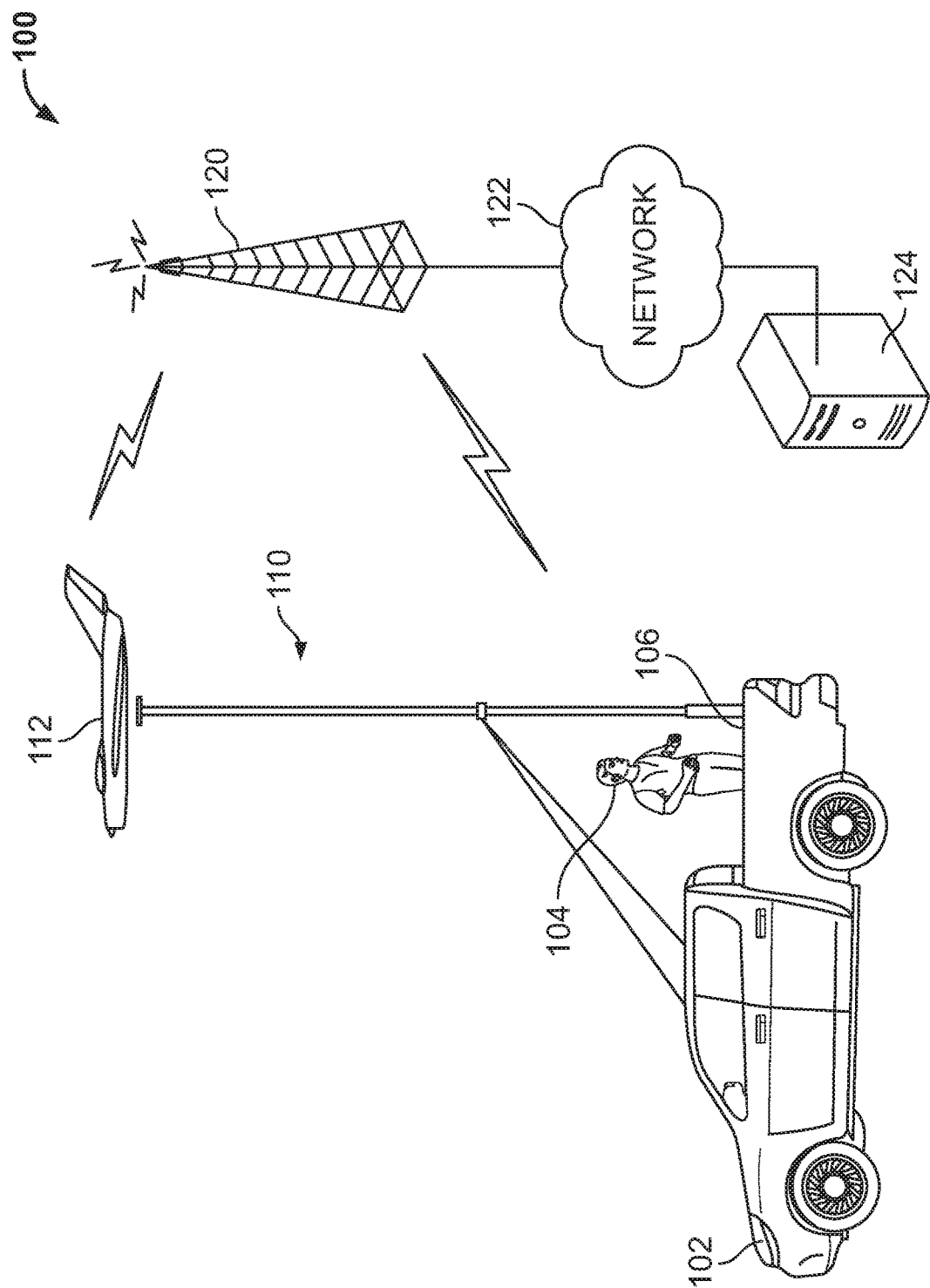
FIG. 1 illustrates an example unmanned aerial vehicle (UAV) launch and recovery system in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Unmanned aerial vehicle (UAV) launch and recovery is disclosed. Some known UAV recovery systems can subject a UAV to relatively high loads during impact of the UAV with the UAV recovery system. In particular, the UAV can undergo significant impact forces when the wing of the UAV impacts a net or pole of the UAV recovery system. These known UAV recovery systems typically require relatively large and bulky equipment that is towed.

Examples disclosed herein enable an effective and relatively low cost recovery/launch of an aircraft (e.g., a UAV) from a moving vehicle. In particular, examples disclosed herein enable the aircraft to be recovered by the moving vehicle so that impact and deceleration forces are reduced while allowing the aircraft to be recovered with relative ease. Examples disclosed herein can be implemented on existing UAVs as an additional capture implementation. Examples disclosed herein can be relatively smaller and lighter and portable than known UAV recovery systems.

Examples disclosed herein utilize a support mount (e.g., a pole, an articulated pole, an extension, etc.) that extends from a vehicle that is moving. In particular, during recovery of the aircraft by the vehicle, the support mount can articulate, pivot and/or move relative to the vehicle so that a rare earth magnet attached to the support mount can be used to attract and couple the aircraft to the support mount. As a result, minimal or negligible impact forces are applied to the aircraft and the aircraft can be recovered with relative ease.

In some examples, elastic bands are used to guide a movement (e.g., a pivoting and/or translation movement) of the support mount toward the aircraft. In some examples, an actuator is used to pivot and/or move the support mount towards the aircraft. In such examples, a coordinated movement of the actuator can be controlled by an aircraft recovery controller that is communicatively coupled to a flight navigation controller. In other examples, a person or operator being transported by the vehicle moves the support mount toward the aircraft as the aircraft is being recovered.

As used herein, the term "support arm" refers to an extension or structure, such as a pole or arm, for example, that extends away from a body of a vehicle for the purposes of recovering another vehicle. As used herein, the terms "telescoping," "telescopic stem," "telescoping tube" or "telescopic tube" refer to a structure, such as a collapsing/telescoping pole, in which a longitudinal length thereof can be adjusted.

FIG. 1 illustrates a UAV launch and recovery system 100 in accordance with the teachings of this disclosure. The UAV launch and recovery system 100 of the illustrated example includes a vehicle (e.g., a launch and recovery vehicle) 102 with an operator (e.g., a person, a user, etc.) 104 standing on an operator area (e.g., a vehicle bed) 106. In this example, a support mount (e.g., an aircraft recovery support mount) 110 is mounted to the operator area 106 for recovery or launch of an aircraft 112, which is implemented as a UAV in this example. In some examples, the UAV launch and recovery system 100 also includes a transceiver 120 that is communicatively coupled to a network 122 and a control server 124.

In operation, the aircraft 112 is recovered by the support mount 110 as both the aircraft 112 and the vehicle 102 are moving. In particular, a movement of the aircraft 112 is coordinated with a movement of the vehicle 102 so that the aircraft 112 is brought into proximity of the vehicle 102. According to the illustrated example, the operator 104 can move (e.g., laterally move) and/or articulate the support mount 110 so that the support mount 110 can attract and be coupled to the aircraft 112 during recovery of the aircraft 112. In particular, the operator 104 can cause the support mount 110 to contact the aircraft 112 as the aircraft 112 moves in close proximity to the vehicle 102. In other words, the support mount 110 is moved toward the aircraft 112 based on operator-adjusted movement. In other examples, an actuator 218 shown in FIG. 2 is implemented instead of the operator 104.

According to the illustrated example, to coordinate movement of the aircraft 112 relative to the vehicle 102, the transceiver 120 is communicatively coupled (e.g., in wireless communication) with both the aircraft 112 and the vehicle 102. In particular, the transceiver 120 receives position/movement data from the aircraft 112 and the vehicle 102 and forwards this position/movement data to the network 122 and/or the control server 124. In turn, the network 122 and/or the control server 124 sends movement commands, via the transceiver 120, to direct movement of the aircraft 112 and/or the vehicle 102 so that the aircraft 112 and the vehicle 102 can be brought in relatively close proximity of one another. In this example, a heading and a velocity of the aircraft 112 and the vehicle 102 are matched to a requisite degree to facilitate recovery of the aircraft 112. In some examples, global positioning system (GPS) data is used to coordinate relative movement between the aircraft 112 and the vehicle 102.

While the vehicle 102 is shown implemented as an automobile in this example, the vehicle 102 can be implemented as, but is not limited to, a fixed wing aircraft, a rotorcraft, another UAV, a boat, a ship, a submarine, a quadcopter, a spacecraft, etc.

Figure 2:
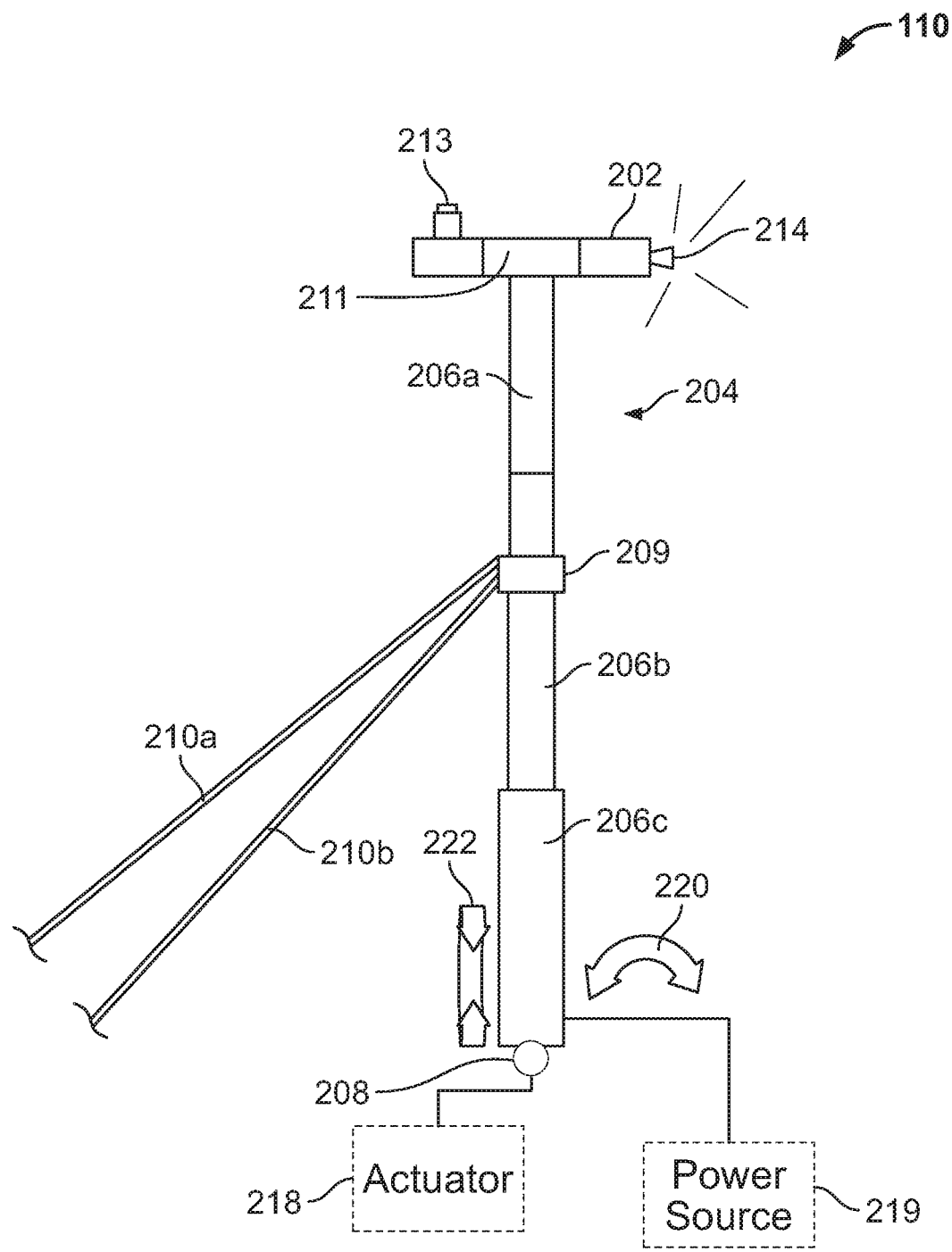
FIG. 2 is a detailed view of an example support mount of the UAV launch and recovery system of FIG. 1.

FIG. 2 is a detailed view of the example support mount 110 of the UAV launch and recovery system 100 of FIG. 1. According to the illustrated example, the support mount 110 includes a contact portion (e.g., a contact disc, an interface pad, a mount, a support mount interface, an aircraft mount, etc.) 202, a stem (e.g., a support arm) 204 with telescoping portions or sections 206 (hereinafter 206a, 206b, 206c, etc.), a pivot (e.g., a pivot joint, a rotational joint, etc.) 208, a collar 209, and elastic arms (e.g., elastic straps) 210 (hereinafter 210a, 210b, etc.). The contact portion 202 of the illustrated is disc-shaped and includes a magnet 211, which is implemented as a rare earth magnet in this example. In this example, the contact portion 202 also includes a protrusion or peg 213 and a light 214. In some examples, the support mount 110 includes the aforementioned actuator 218 and a corresponding power source 219.

To move (e.g., translate, pivot and/or rotate) the contact portion 202 proximate to the aircraft 112 (shown in FIG. 1), the example stem 204 is pivoted about the pivot 208 in directions generally indicated by double arrows 220, 222. In particular, the elastic arms 210a, 210b are attached to the collar 209 to support and/or guide the stem 204 as the stem 204 is moved about the pivot 208. In some examples, the pivot 208 is a rigid joint and elastic bending of the stem 204 is used to move the contact portion 202. Additionally or alternatively, the contact portion 202 can be moved along a longitudinal length of the stem 204 based on extension or retraction (e.g., contraction) of the telescoping portions or sections 206a, 206b 206c.

In some other examples, the magnet 211 is implemented as an electromagnet instead of a rare earth magnet. For example, the electromagnet can be activated upon sensor determination of a presence of the aircraft 112. In other examples, the magnet 211 is implemented on the aircraft 112 instead. In some examples, the collar 209 can be moved (e.g., translated) along a length of the stem 204. In some examples, the stem 204 and/or the contact portion 202 are moved by the actuator 218 to bring the contact portion 202 in closer proximity to the aircraft 112. In some such examples, the control server 124 can be used to control the actuator 218 via the transceiver 120. In some examples, the contact portion is implemented as a round disc with an approximate diameter of 3 to 5 inches (e.g., 4 inches).

In some examples, the light 214 is implemented so that the aircraft 112 can track and/or locate the contact portion 202 for recovery. In particular, the aircraft 112 can be guided and/or guide itself based on the light 214. In some examples, the light 214 strobes and/or pulses to guide the aircraft 112.

Figure 3:
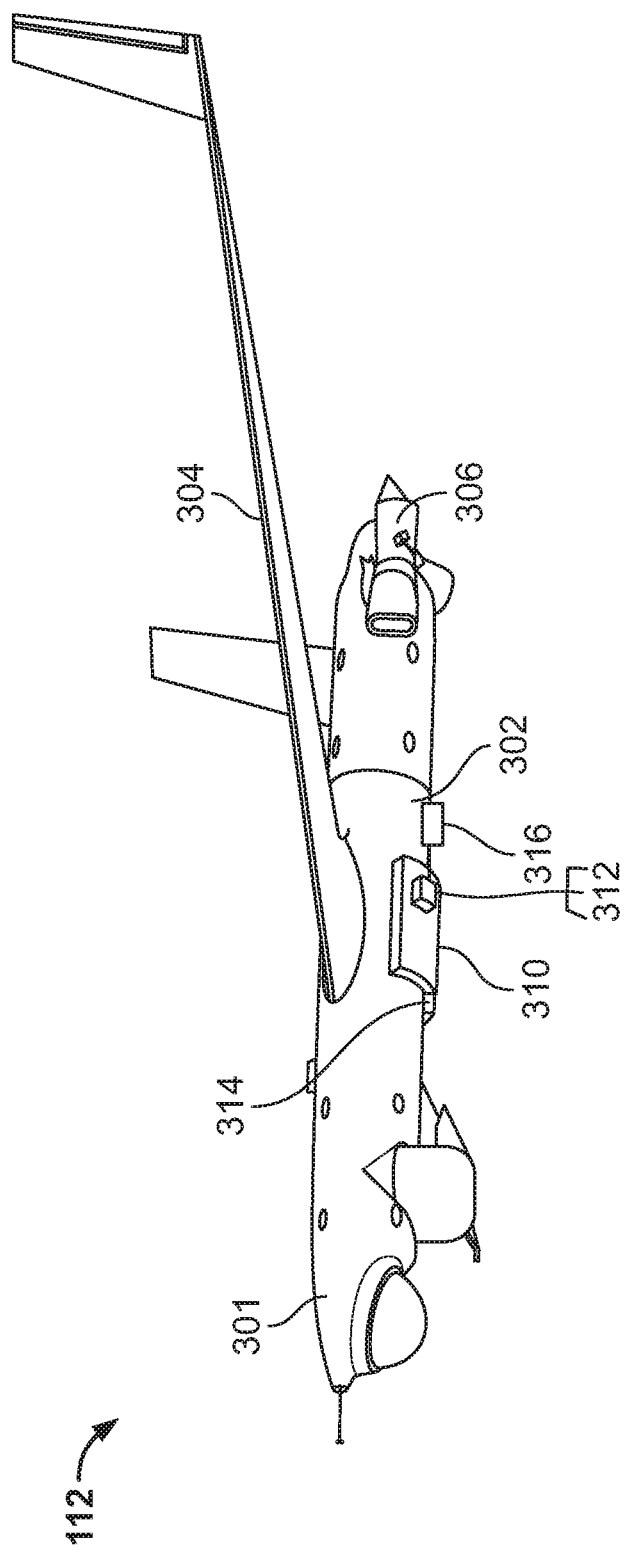
FIG. 3 illustrates an example UAV of the UAV launch and recovery system of FIG. 1.

FIG. 3 illustrates the example aircraft 112 of the UAV launch and recovery system 100 of FIG. 1. As mentioned above, the aircraft 112 of the illustrated example is implemented as a UAV. The example aircraft 112 includes a nose portion (e.g., a guidance portion) 301, a body or fuselage 302, wings 304, a propulsion system 306 and a contact plate 310. In some examples, the contact plate 310 includes a magnet 312 (e.g., a rare earth magnet, an electromagnet, a corresponding magnet, etc.), an alignment portion (e.g., an indent, a chamfer, etc.) 314 and a sensor 316.

To couple the aircraft 112 to the contact portion 202 (of FIG. 2), the contact plate 310 is implemented as a metal plate (e.g., a steel plate) or a block that is attracted to the magnet 211 (of FIG. 2). In particular, bringing the contact plate 310 in relatively close proximity to the magnet 211 causes a movement of the aircraft 112 toward the contact portion 202 based on attractive forces between the magnet 211 and the contact plate 310. As a result, the contact plate 310 is secured to the contact portion 202. Additionally or alternatively, the sensor 316 is used to help guide the aircraft 112 toward the contact portion 202 so that the magnet 211 can have a sufficient attractive force to move the contact plate 310 along with the aircraft 112 toward the contact portion 202 and, thus, secure the aircraft 112 to the contact portion 202. For example, the sensor 316 can detect the light 214 shown in FIG. 2 to facilitate guidance of the aircraft 112 to the contact portion 202.

In some examples, the contact plate 310 is mounted to the nose portion 301 or the wings 304. In other examples, the magnet 211 acts upon the fuselage 302 (e.g., the contact plate 310 is not implemented on the aircraft 112). In some examples, the alignment portion 314, which may be implemented as an alignment surface, chamfer and/or aperture, receives the protrusion 213 to guide a relative position and/or orientation between the aircraft 112 and the contact portion 202 during the recovery of the aircraft 112.

Figure 4:
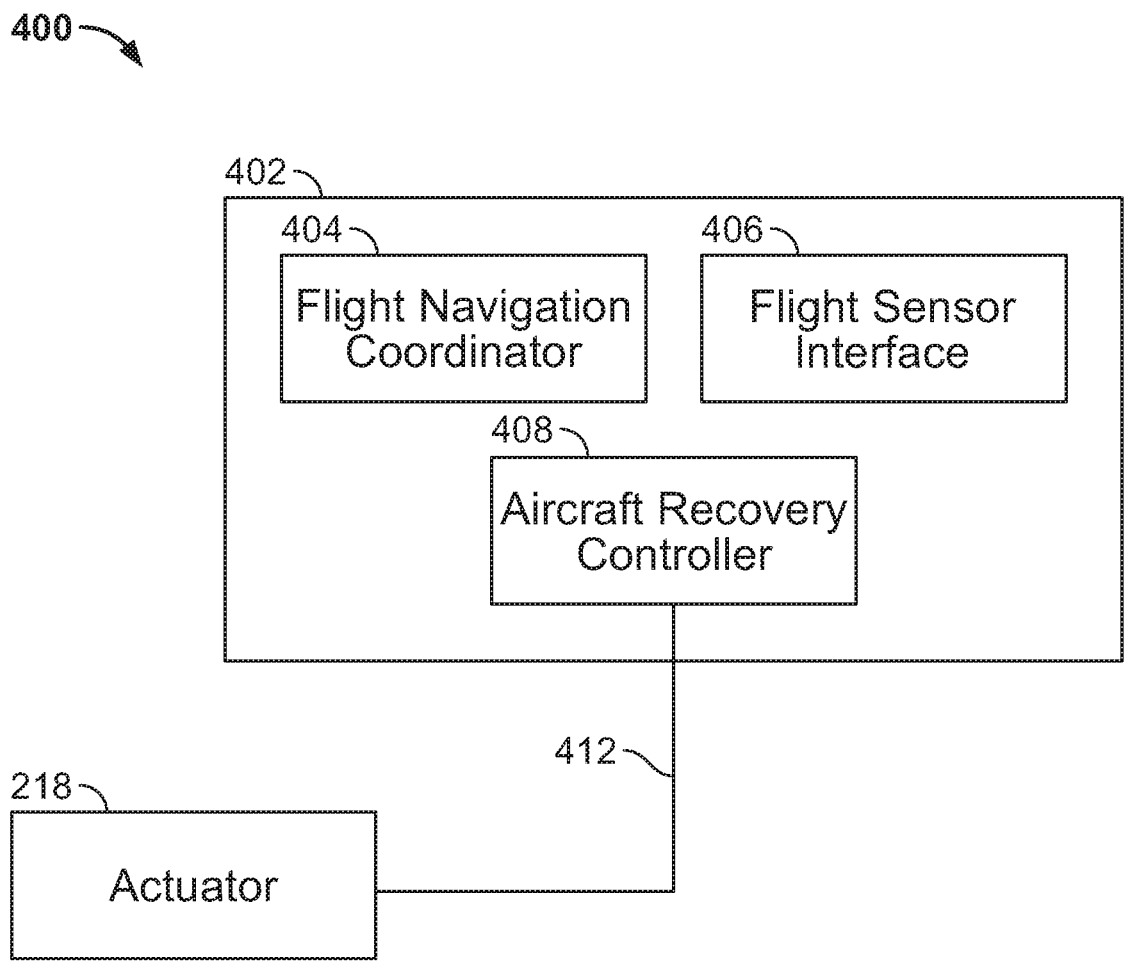
FIG. 4 is a schematic overview of an aircraft recovery control system that can be implemented in examples disclosed herein.

FIG. 4 is a schematic overview of an aircraft recovery control system 400 that can be implemented in examples disclosed herein. The example aircraft recovery control system 400 includes a flight analysis calculator 402 having a flight navigation coordinator 404, a flight sensor interface 406 and aircraft recovery controller 408. In this example, the actuator 218 is communicatively coupled to the aircraft recovery controller 408 via a communication line 412.

The flight navigation coordinator 404 of the illustrated example directs movement of at least one of the aircraft 112 and/or the vehicle 102 based on sensor and/or telemetry data received at the flight sensor interface 406 and associated with the aircraft 112. According to the illustrated example, the flight navigation coordinator 404 causes the aircraft 112 to move along a defined heading and at a speed relative to the vehicle 102 so that the contact portion 202 can be brought within a threshold proximity (e.g., a magnetic attraction force threshold distance, etc.) relative to the contact plate 310. In some examples, the flight navigation coordinator 404 controls the vehicle 102, which can be implemented as autonomous vehicle in some examples, along with the aircraft 112 to coordinate a recovery of the aircraft 112.

To control movement of the contact portion 202 toward the aircraft 112, the aircraft recovery controller 408 calculates a desired movement of the support mount 110, in some examples. In such examples, the aircraft recovery controller 408 determines both an angular displacement and elongation of the stem 204 so that the contact portion 202 can be moved proximate the contact plate 310. In some examples, the aircraft recovery controller 408 directs the actuator 218 to rotate and/or vary a length of the stem 204.

In some examples, the flight navigation coordinator 404 directs the vehicle 102 to slow down (e.g., brake) as the aircraft 112 is about to recovered at the recovery portion 202. In some examples, the aircraft recovery controller 408 controls a current applied to the magnet 211 when the magnet 211 is implemented as an electromagnet. In such examples, the magnet 211 can be supplied with a current when the aircraft 112 is determined to be within a threshold range of the contact portion 202.

While an example manner of implementing the aircraft recovery control system 400 of FIG. 4 is illustrated in FIG. 4, one or more of the elements, processes and/or devices illustrated in FIG. 4 may be combined, divided, re-arranged, omitted, eliminated and/or implemented in any other way. Further, the example flight navigation coordinator 404, the example flight sensor interface 406, the example aircraft recovery controller 408 and/or, more generally, the example aircraft recovery control system 400 of FIG. 4 may be implemented by hardware, software, firmware and/or any combination of hardware, software and/or firmware. Thus, for example, any of the example flight navigation coordinator 404, the example flight sensor interface 406, the example aircraft recovery controller 408 and/or, more generally, the example aircraft recovery control system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flight navigation coordinator 404, the example flight sensor interface 406, and/or the example aircraft recovery controller 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example aircraft recovery control system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
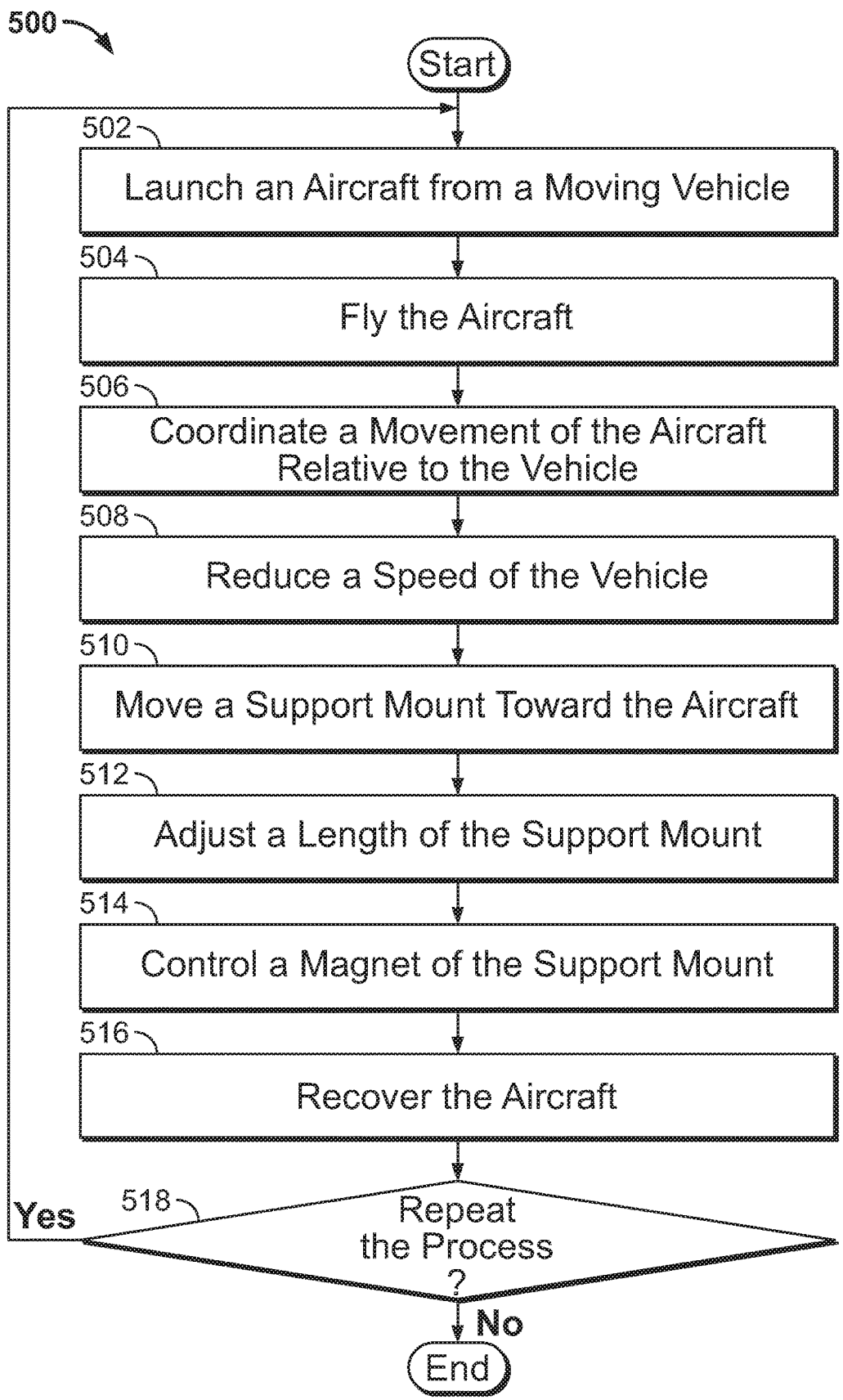
FIG. 5 is an example method that can be implemented in examples disclosed herein.

A flowchart representative of example hardware logic, machine readable instructions, hardware implemented state machines, and/or any combination thereof for implementing the aircraft recovery control system 400 of FIG. 4 is shown in FIG. 5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example aircraft recovery control system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is an example method 500 that can be implemented in examples disclosed herein. In this example, the aircraft 112 is to be launched and recovered by the vehicle 102.

The aircraft 112 is launched from the moving vehicle 102 (block 502). In this example, the aircraft 112 is launched after being mounted to the contact portion 202. In this example, the magnet 211 is disengaged or moved away from the aircraft 112 to enable the aircraft 112 to depart therefrom.

The aircraft 112 is flown (block 504). In this example, the aircraft 112 is implemented as a UAV and is guided by the control server 124.

According to the illustrated example, the flight navigation coordinator 404 coordinates a movement of the aircraft 112 relative to the vehicle 102 (block 506). Additionally or alternatively, the flight navigation coordinator 404 directs a movement of the vehicle 102 relative to the aircraft 112. In this example, the flight navigation coordinator 404 utilizes sensor data from the flight sensor interface 406.

In some examples, a speed of the vehicle 102 is reduced prior to recovering the aircraft 112 (block 508). In such examples, the flight navigation coordinator 404 can control the vehicle 102 and/or direct a driver of the vehicle 102, for example.

In this example, the aircraft recovery controller 408 moves the support mount 110 toward the aircraft 112 (block 510). In particular, the aircraft recovery controller 408 causes the actuator 218 to angle, pivot, and/or translate the stem 204 and, thus, the contact portion 202 toward the contact plate 310 of the aircraft 112. In some examples, the contact portion 202 is moved to contact the plate 310.

In some examples, a length of the stem 204 is adjusted to bring the contact portion 202 closer to the contact plate 310 (block 512). In particular the telescoping portions 206a, 206b, 206c are extended or contracted along a longitudinal direction of the stem 204 to move the contact portion 202.

In some examples, the magnet 211 of the support mount 110 is controlled (block 514). In such examples, when the magnet 211 is implemented as an electromagnet, a current applied to the magnet 211 can be varied to control the magnet 211. Additionally or alternatively, the magnet 211 is moved and/or actuated away or toward the contact portion 202.

The aircraft 112 is then recovered by the vehicle 102 (block 516). In particular, the contact plate 310 of the aircraft 112 is brought within a range of the magnet 211 in which magnetic attraction forces are strong enough to draw and couple the aircraft 112 to the contact portion 202.

It is then determined whether to repeat the process (block 518). If the process is to be repeated (block 518), control of the process returns to block 502. Otherwise, the process ends.

Figure 6:
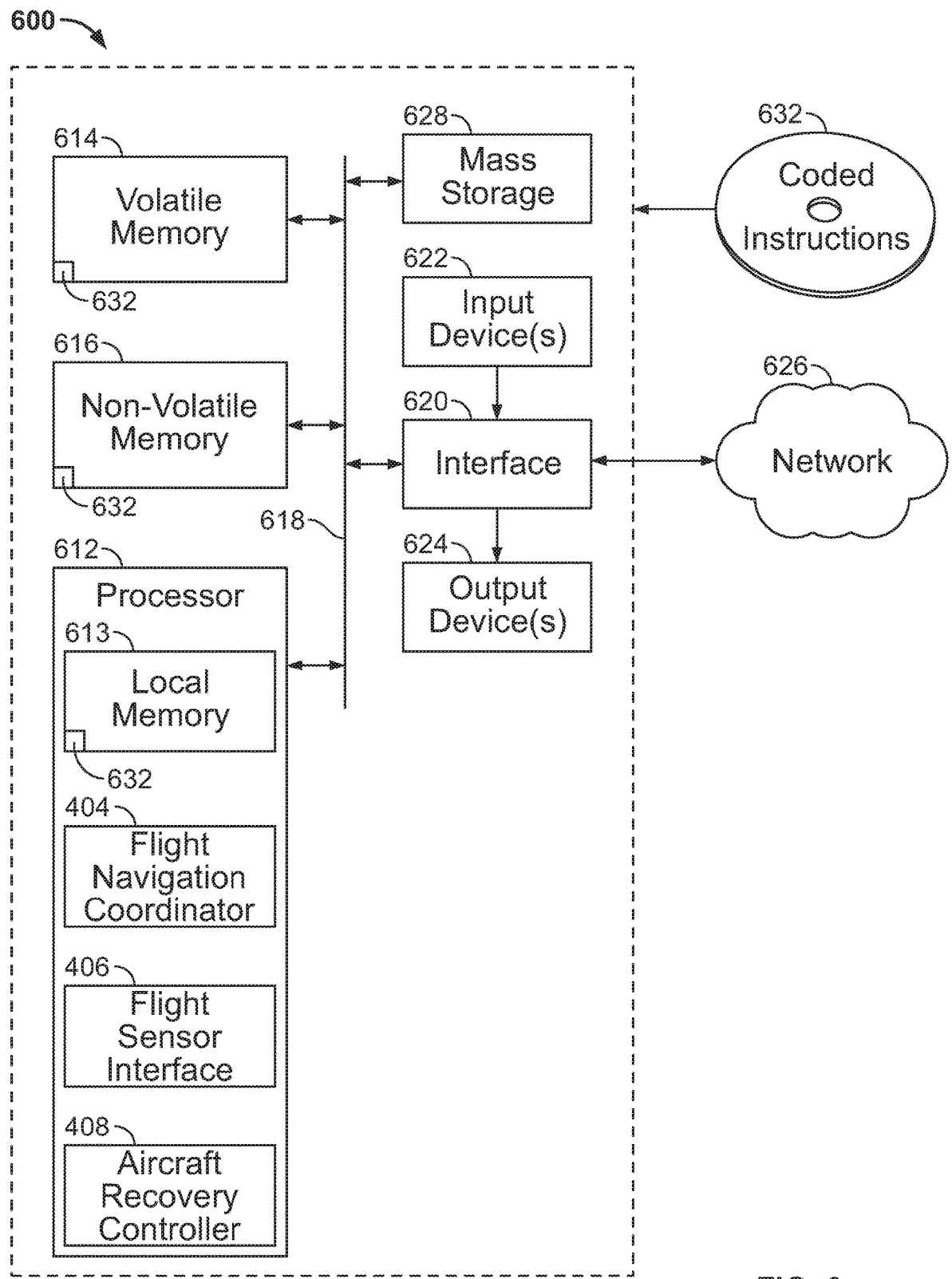
FIG. 6 is a block diagram of an example processing platform structured to execute the example method of FIG. 5 and/or the example UAV launch and recovery system of FIG. 1.

FIG. 6 is a block diagram of an example processor platform 600 structured to execute the instructions of FIG. 5 to implement the aircraft recovery control system 400 of FIG. 4. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight navigation coordinator 404, the example flight sensor interface and the example aircraft recovery controller 408.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 1020 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

Example 1 includes an apparatus having an aircraft mount to be coupled to a vehicle, the aircraft mount having a magnet, and a support arm to extend from a body of the vehicle and support the aircraft mount, where the support arm is to be moved relative to the vehicle while the vehicle is moving to bring the aircraft mount toward an aircraft to recover the aircraft.

Example 2 includes the apparatus of Example 1, and further includes an elastic strap extending from the body of the vehicle to the support arm.

Example 3 includes the apparatus of Example 1, where the support arm includes a telescoping tube.

Example 4 includes the apparatus of Example 3, where the telescoping tube is to be disposed near an operator area of the vehicle to facilitate operator-adjusted movement of the telescoping tube during recovery of the aircraft.

Example 5 includes the apparatus of Example 1, where the magnet is a rare earth magnet.

Example 6 includes the apparatus of Example 1, where the vehicle is an automobile, and wherein the aircraft is an unmanned aerial vehicle (UAV).

Example 7 includes the apparatus of Example 1, where the aircraft includes a metal plate to be coupled to the aircraft mount via the magnet.

Example 8 includes the apparatus of Example 1, where the magnet is a first magnet, and wherein the aircraft includes a second magnet to be attracted to the first magnet.

Example 9 includes a method that includes moving a vehicle having an aircraft mount located at an end of a support arm extending from a body of the vehicle, moving the support arm toward an aircraft while the vehicle moves, and coupling, via a magnet of at least one of the vehicle or the aircraft, the aircraft to the aircraft mount when the aircraft moves within proximity of the aircraft mount.

Example 10 includes the method of Example 9, and further includes coordinating, via an instruction executed by a processor, a movement of the aircraft with a movement of the vehicle to bring the aircraft within the proximity of the aircraft mount.

Example 11 includes the method of Example 10, where the aircraft is a first unmanned aerial vehicle (UAV) and the vehicle is a second UAV, wherein the second UAV is to support the first UAV when the first UAV is coupled thereto.

Example 12 includes the method of Example 9, where moving the support arm includes elastically bending the support arm closer to the aircraft.

Example 13 includes the method of Example 12, where bending the support arm includes controlling an actuator operatively coupled to the support arm.

Example 14 includes the method of Example 12, where bending the support arm includes moving elastic straps coupled to the support arm.

Example 15 includes the method of Example 9, where the support arm includes a telescopic tube, and further including adjusting a length of the telescopic tube to bring the aircraft mount within a threshold proximity of the vehicle.

Example 16 includes an aircraft recovery support mount including a telescopic stem to extend from a body of a vehicle, a support mount interface positioned at an end of the telescopic stem, the support mount interface having a magnet, and a pivot to couple the telescopic stem to the vehicle, wherein the pivot is to allow the telescopic stem to move the support mount interface toward an aircraft to recover the aircraft while the vehicle is moving.

Example 17 includes the aircraft recovery support mount of Example 16, and further includes an actuator to direct pivoting of the telescopic stem about the pivot.

Example 18 includes the aircraft recovery support mount of Example 17, where the actuator is to control an extension or retraction of the telescopic stem.

Example 19 includes the aircraft recovery support mount of Example 16, and further includes an elastic arm to be operatively coupled between the vehicle and the telescopic stem.

Example 20 includes the aircraft recovery support mount of Example 16, wherein the magnet includes an electromagnet.

From the foregoing, it will be appreciated that example methods, apparatus and articles of manufacture have been disclosed that enable cost-effective and easy-to-implement aircraft recovery. Examples disclosed herein account for positional and/or velocity mismatch between a recovery vehicle and an aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to aircraft recovery, examples disclosed herein can be applied to any appropriate application in which a moving object is being recovered.

What is claimed is:

1. An apparatus comprising:
    an aircraft mount to be coupled to a vehicle, the aircraft mount having a magnet;
    a support arm to extend from a body of the vehicle and support the aircraft mount, the support arm to be moved relative to the vehicle while the vehicle is moving to bring the aircraft mount toward an aircraft to recover the aircraft; and
    an elastic strap extending from the body of the vehicle to the support arm.

2. The apparatus as defined in claim 1, wherein the support arm includes a telescoping tube.

3. The apparatus as defined in claim 2, wherein the telescoping tube is to be disposed near an operator area of the vehicle to facilitate operator-adjusted movement of the telescoping tube during recovery of the aircraft.

4. The apparatus as defined in claim 1, wherein the magnet is a rare earth magnet.

5. The apparatus as defined in claim 1, wherein the vehicle is an automobile, and wherein the aircraft is an unmanned aerial vehicle (UAV).

6. The apparatus as defined in claim 1, wherein the aircraft includes a metal plate to be coupled to the aircraft mount via the magnet.

7. The apparatus as defined in claim 1, wherein the magnet is a first magnet, and wherein the aircraft includes a second magnet to be attracted to the first magnet.

8. A method comprising:
    moving a vehicle having an aircraft mount located at an end of a support arm extending from a body of the vehicle;

moving the support arm toward an aircraft while the vehicle moves, wherein moving the support arm includes elastically bending the support arm closer to the aircraft; and coupling, via a magnet of at least one of the vehicle or the aircraft, the aircraft to the aircraft mount when the aircraft moves within proximity of the aircraft mount.

9. The method as defined in claim 8, further including coordinating, via an instruction executed by a processor, a movement of the aircraft with a movement of the vehicle to bring the aircraft within the proximity of the aircraft mount.

10. The method as defined in claim 9, wherein the aircraft is a first unmanned aerial vehicle (UAV) and the vehicle is a second UAV, wherein the second UAV is to support the first UAV when the first UAV is coupled thereto.

11. The method as defined in claim 8, wherein bending the support arm includes controlling an actuator operatively coupled to the support arm.

12. The method as defined in claim 8, wherein bending the support arm includes moving elastic straps coupled to the support arm.

13. The method as defined in claim 8, wherein moving the support arm includes adjusting a length of a telescopic tube to bring the aircraft mount within a threshold proximity of the vehicle.

14. An aircraft recovery support mount comprising:
a telescopic stem to extend from a body of a vehicle;
a support mount interface positioned at an end of the telescopic stem, the support mount interface having a magnet;
a pivot to couple the telescopic stem to the vehicle, wherein the pivot is to allow the telescopic stem to move the support mount interface toward an aircraft to recover the aircraft while the vehicle is moving; and
an elastic arm to be operatively coupled between the vehicle and the telescopic stem.

15. The aircraft recovery support mount as defined in claim 14, further including an actuator to direct pivoting of the telescopic stem about the pivot.

16. The aircraft recovery support mount as defined in claim 15, wherein the actuator is to control an extension or retraction of the telescopic stem.

17. The aircraft recovery support mount as defined in claim 14, wherein the magnet includes an electromagnet.

18. The apparatus as defined in claim 8, further including an actuator coupled to the support arm, the actuator to bend the support arm closer to the aircraft.

19. The apparatus as defined in claim 8, further including an actuator coupled to the elastic strap, the actuator to move the elastic strap to cause the support arm to move closer to the aircraft.

20. The aircraft recovery support mount as defined in claim 14, further including an actuator to move the elastic arm.

* * * * *